US010529149B1

(12) United States Patent
Manoukis et al.

(10) Patent No.: US 10,529,149 B1
(45) Date of Patent: Jan. 7, 2020

(54) OFF ROAD VEHICLE NETWORK TRANSLATION DEVICE

(71) Applicant: ATV-LINK LLC, Tylersport, PA (US)

(72) Inventors: Dimitrios James Chirivas Manoukis, Tylersport, PA (US); Harry Brink, Flint, MI (US)

(73) Assignee: ATV-LINK LLC, Tylersport, PA (US)

( * ) Notice: Subject to any disclaimer, the term of this patent is extended or adjusted under 35 U.S.C. 154(b) by 10 days.

(21) Appl. No.: 15/842,114

(22) Filed: Dec. 14, 2017

Related U.S. Application Data

(60) Provisional application No. 62/435,153, filed on Dec. 16, 2016.

(51) Int. Cl.
| | | |
|---|---|---|
| *G06F 7/00* | (2006.01) | |
| *G06F 17/00* | (2019.01) | |
| *G06F 21/34* | (2013.01) | |
| *G06F 21/50* | (2013.01) | |
| *G07C 5/08* | (2006.01) | |
| *G07C 5/00* | (2006.01) | |
| *H04L 29/08* | (2006.01) | |
| *H04L 29/06* | (2006.01) | |
| *H04L 12/40* | (2006.01) | |

(52) U.S. Cl.
CPC ........... *G07C 5/0808* (2013.01); *G07C 5/008* (2013.01); *H04L 67/12* (2013.01); *H04L 67/2823* (2013.01); *H04L 69/08* (2013.01); *H04L 2012/40215* (2013.01)

(58) Field of Classification Search
None
See application file for complete search history.

(56) References Cited

U.S. PATENT DOCUMENTS

| | | | | |
|---|---|---|---|---|
| 7,553,173 B2* | 6/2009 | Kowalick | ............ | H01R 13/443 439/133 |
| 9,165,131 B1* | 10/2015 | Kowalick | ............... | G06F 21/62 |
| 2006/0161315 A1* | 7/2006 | Lewis | ....................... | G08G 1/20 701/1 |
| 2008/0214022 A1* | 9/2008 | Kowalick | ............ | H01R 13/443 439/34 |
| 2010/0179721 A1* | 7/2010 | Willard | .................. | G07C 5/085 701/31.4 |
| 2012/0004804 A1* | 1/2012 | Beams | .................. | G01S 5/0027 701/32.7 |
| 2013/0066512 A1* | 3/2013 | Willard | ................. | B60T 17/221 701/29.1 |
| 2013/0218371 A1* | 8/2013 | Simard | ................ | B60W 50/08 701/2 |

\* cited by examiner

*Primary Examiner* — Thomas G Black
*Assistant Examiner* — Demetra R Smith-Stewart
(74) *Attorney, Agent, or Firm* — Raggio & Dinnin, P.C.

(57) ABSTRACT

A translation device that allows communication between off road vehicle networks and standard on board diagnostic tools, such as phone applications, other interface devices, computers, etc. The translation device maybe programmed to specifically be compatible with one off road vehicle manufacturer network but compliant to a universal output that may be read and controlled by various software packages and devices using the standard ISO 15031 messaging system.

19 Claims, 8 Drawing Sheets

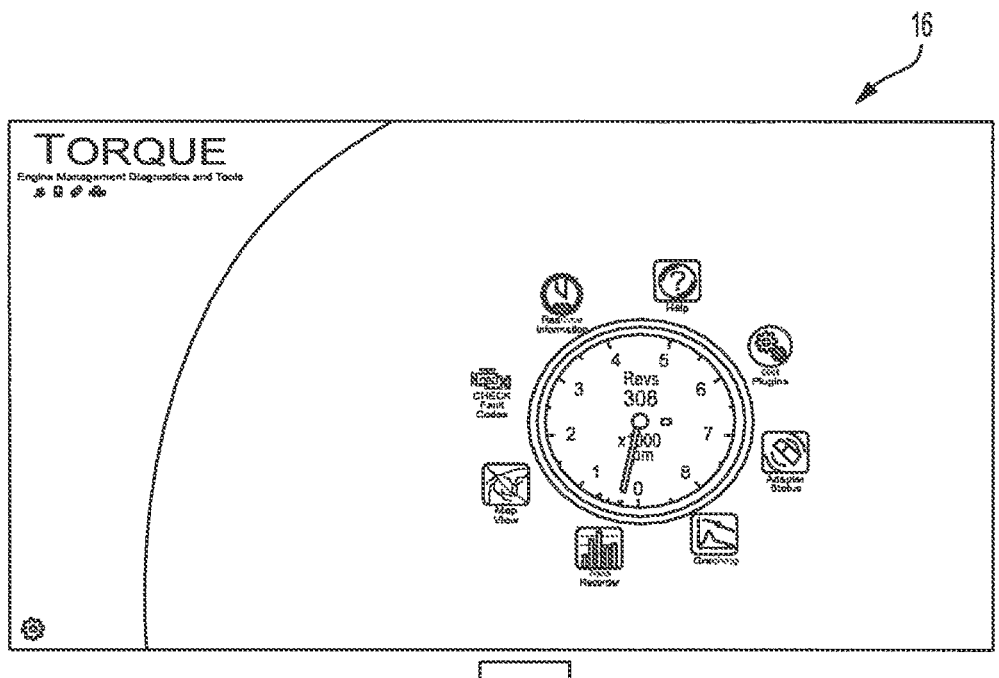
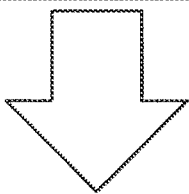
```
"10/15/15 11:07:10 PM";ATZ        736252.963319,ATZ
"10/15/15 11:07:12 PM";ATE0
"10/15/15 11:07:13 PM";ATE0
"10/15/15 11:07:13 PM";ATM0       736252.963328,ELM327 v1.5
"10/15/15 11:07:13 PM";ATL0
"10/15/15 11:07:13 PM";ATS0       736252.963328,>ATE0
"10/15/15 11:07:13 PM";AT@1       736252.963343,OK
"10/15/15 11:07:13 PM";ATI
"10/15/15 11:07:13 PM";ATH0       736252.963343,>OK
"10/15/15 11:07:13 PM";ATAT2
"10/15/15 11:07:13 PM";ATSP0      736252.963347,>OK
"10/15/15 11:07:13 PM";0100
"10/15/15 11:07:16 PM";ATH1       736252.963348,>OK
"10/15/15 11:07:16 PM";ATDPN
"10/15/15 11:07:16 PM";0100       736252.963348,>OK
"10/15/15 11:07:16 PM";0100
"10/15/15 11:07:16 PM";0120       736252.963349,>OBDII to RS232 /Interpreter
"10/15/15 11:07:16 PM";0140
"10/15/15 11:07:16 PM";ATH1       736252.96335,>ELM327 v1.5
"10/15/15 11:07:16 PM";010D
"10/15/15 11:07:17 PM";010D       736252.96335,>OK
"10/15/15 11:07:17 PM";010D
"10/15/15 11:07:18 PM";0110       736252.96335,>OK
"10/15/15 11:07:18 PM";010C
```
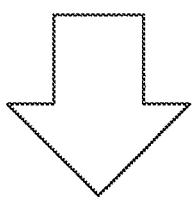
FIG. 5

FIG. 7

OFF ROAD VEHICLE NETWORK TRANSLATION DEVICE

This Application claims the benefit of U.S. Provisional Patent Application No. 62/435,153—Filed: Dec. 16, 2016

BACKGROUND OF THE INVENTION

1. Field of the Invention

The invention generally relates to off road vehicle networks and more particularly relates to an off road vehicle network translation device, which translates information into an ISO 15031 standard communication.

2. Description of Related Art

Diagnostic testers for motor vehicles that contain programmable control units have been well known in the prior art. Such programmable control units may contain self diagnostic means and control, monitor the engine control and other systems of a motor vehicle in a program controlled manner. In self diagnosis, error codes are generated and stored. These control units and the error code storage devices may be connected to an external diagnostic tester via diagnostic/test plug in the vehicle. In some prior art devices, remote diagnostics and analysis of the performance of a vehicle may require the storage and transmission of entire configuration files from a central processing center to vehicle electronics. Such transmission tends to inefficiently use one or more communication channels between the central processing center and the vehicle electronics. A land based communication channel may be unavailable or unreliable when the vehicle and associated vehicle electronics are located in rural areas. As an example in the prior art, the transmission of entire configuration files and enhanced remote diagnostics, may not be economically feasible where more expensive satellite communication channels are required to handle a significant throughput of data and entire communication files. Furthermore, in some prior art systems remote diagnostics and analysis of the performance of vehicles may require distinct software payloads to accommodate both local connection to the vehicle, via wireless or short range wireless connection or a remote connection to the vehicle via a wireless communication systems. The distinct software payloads tend to require duplicate software that can overload processing capability or data processing throughput of the vehicle electronics. Therefore, since late 1995 generally automobiles produced for North America have been required to comply with on board diagnostics (OBDII) standards and in these there are ISO-15031 standard communications. This standard allows for retrieval of diagnostic codes as well as requests for service ID's (SID) from the modules on the vehicle network. In order to view the information from the automobile network, a user interface may be connected to the automobile network via a physical connection or with a wireless device connection to the OBDII port. In one prior art system, this OBDII port may also be standardized under SAE J1962 for an on road vehicle built since 1995. However, most of the off road vehicle networks are not required to comply with any OBDII standard communication. In fact, each individual manufacturer of an off road vehicle uses their own proprietary communication and network system along with proprietary software to operate and communicate with the system.

Therefore, there is a need in the art for an off road vehicle network translation device. There also is a need in the art for an off road vehicle network translation device that may be capable of being used on any off road vehicle and convert the proprietary off road vehicle network and network language to an ISO 15031 standard communication. There is a need in the art for an off road vehicle network translation device that may be capable of being plugged directly into a vehicle communication network port or connected via a wireless communication device to the off road vehicle network. There also is a need in the art for an off road vehicle network translation device that may be capable of being connected to any known off road vehicle diagnostic plug via a network of plugs or an expansion module into which the translation device may be plugged into. There also is a need in the art for an off road vehicle network translation device that may be capable of converting manufacturer specific messages into ISO 15031 messages wherein the translated message may then be transmitted to a diagnostic tool in ISO 15031 standards via Bluetooth, Wi-Fi or a wired connection. There also is a need in the art for an off road vehicle network translation device that may be capable of interpreting any off road vehicle specific messaging into any on road vehicle diagnostic tool, thus allowing for translation of multiple formats into a single standard OBDII format.

SUMMARY OF THE INVENTION

One object of the present invention may be to provide an improved translation device.

Another object of the present invention may be to provide an improved off road vehicle network translation device that may be capable of translating into ISO 15031 standard communications.

Still another object of the present invention may be to provide an off road vehicle network translation device that may be capable of converting manufacturer specific messages into ISO 15031 messages.

Yet another object of the present invention may be to provide an off road vehicle network translation device that may be capable of transmitting manufacturer specific messages for an off road vehicle to a diagnostic tool in ISO 15031 standards via Bluetooth, Wi-Fi or a wired connection, such that the transmission may be interpreted by any on road vehicle diagnostic tool.

Still another object of the present invention may be to provide an off road vehicle network translation device that may be capable of monitoring an off road vehicle network and then forwarding this information in an ISO 15031 standard or format.

Yet another object of the present invention may be to provide an off road vehicle network translation device that may be able to accept ISO 15031 requests for SID or trouble codes from a diagnostic tool and then translate the SID code into the specific off road vehicle message format and transmit the same to the off road vehicle manufacturers network.

Yet another object of the present invention may be to provide an off road vehicle network translation device that may be capable of receiving information from the modules of an off road vehicle network and then translate and reply with information in an ISO 15031 format to an OBD diagnostic tool.

Still another object of the present invention may be to provide an off road vehicle network translation device that may be capable of identifying a time delay and send a keep alive message to the diagnostic tool or user interface to ensure when a response is ready from the off road vehicle network that the diagnostic tool may be able to accept it.

To achieve the foregoing objects and other advantages of the present invention, an off road vehicle network translation device is disclosed. The off road vehicle network translation device may be able to take ISO 15031 standard command requests from any variety of OBD tools, phone applications, computer OBD software tools as well as aftermarket ELM 327 command tools and translate them in order to obtain requested data from a specific off road vehicle network. The translation device is able to take all of the collected data from the off road vehicle network, translate it, and then reply to the user interface of the OBD tool in an ISO 15031 formatted response. The OBD tool, which makes the requests, may be unaware that it is in communication with a non-OBDII compliant vehicle, thus allowing the OBD tool to operate as if it were connected to an on the road automobile network. The off road vehicle network translation device may use an algorithm to translate between the off road vehicle networks and standard ISO 15031 standards. The translation device may include an user interface to decode messages in any known commonly used interface or a custom user interface that may allow read and write capabilities to the off road vehicle network.

One advantage of the present invention may be that it provides a novel and improved translation device.

Still another advantage of the present invention may be that it provides a novel and improved off road vehicle network translation device that may be capable of translating into ISO 15031 standard communications.

Still another advantage of the present invention may be that it provides an off road vehicle network translation device that may be capable of converting any manufacturers specific message into ISO 15031 message.

Yet another advantage of the present invention may be that it provides an off road vehicle network translation device that may be capable of transmitting any off road vehicle manufacturers specific message to a diagnostic tool in 15031 standards via Bluetooth, Wi-Fi or any hard wired manner such that they may be interpreted by any on road vehicle diagnostic tool.

Yet another advantage of the present invention may be that it provides an off road vehicle network translation device that may be capable of monitoring an off road vehicle network and then forwarding this information in ISO 15031 format.

Still another advantage of the present invention may be that it provides an off road vehicle network translation device that may be able to accept ISO 15031 requests for SID or trouble codes from a diagnostic tool and then translate them to a specific off road vehicle messaging standard that is unique to the off road vehicle manufacturer to which the translation device is connected.

Still another advantage of the present invention may be that it provides an off road vehicle network translation device that may be capable of receiving information or data from an off road vehicle network and translate that data back into an ISO 15031 standard and reply back to an OBD diagnostic tool.

Still another advantage of the present invention may be that it provides an off road vehicle network translation device that may be capable of identifying a time delay that may exceed the typical ISO 15031 standard and send a keep alive message to the diagnostic tool or user interface to ensure that when a response is made from the off road vehicle network it may be accepted by the diagnostic tool.

Still another advantage of the present invention may be that it provides an off road vehicle network translation device that may be capable of being used with any known off road vehicle and the associated hardware and software of the proprietary off road vehicle.

Still another advantage of the present invention may be that it provides an off road vehicle network translation device that may be easy to manufacture, install in the off road vehicle and use in conjunction with the off road vehicle.

Other objects, features and advantages of the present invention may become apparent from the subsequent description and the appended claims, taken in conjunction with the accompanying drawings.

BRIEF DESCRIPTION OF THE DRAWINGS

FIG. 5 shows a block diagram of the off road vehicle network translation device methodology according to the present invention.

Figure 7:
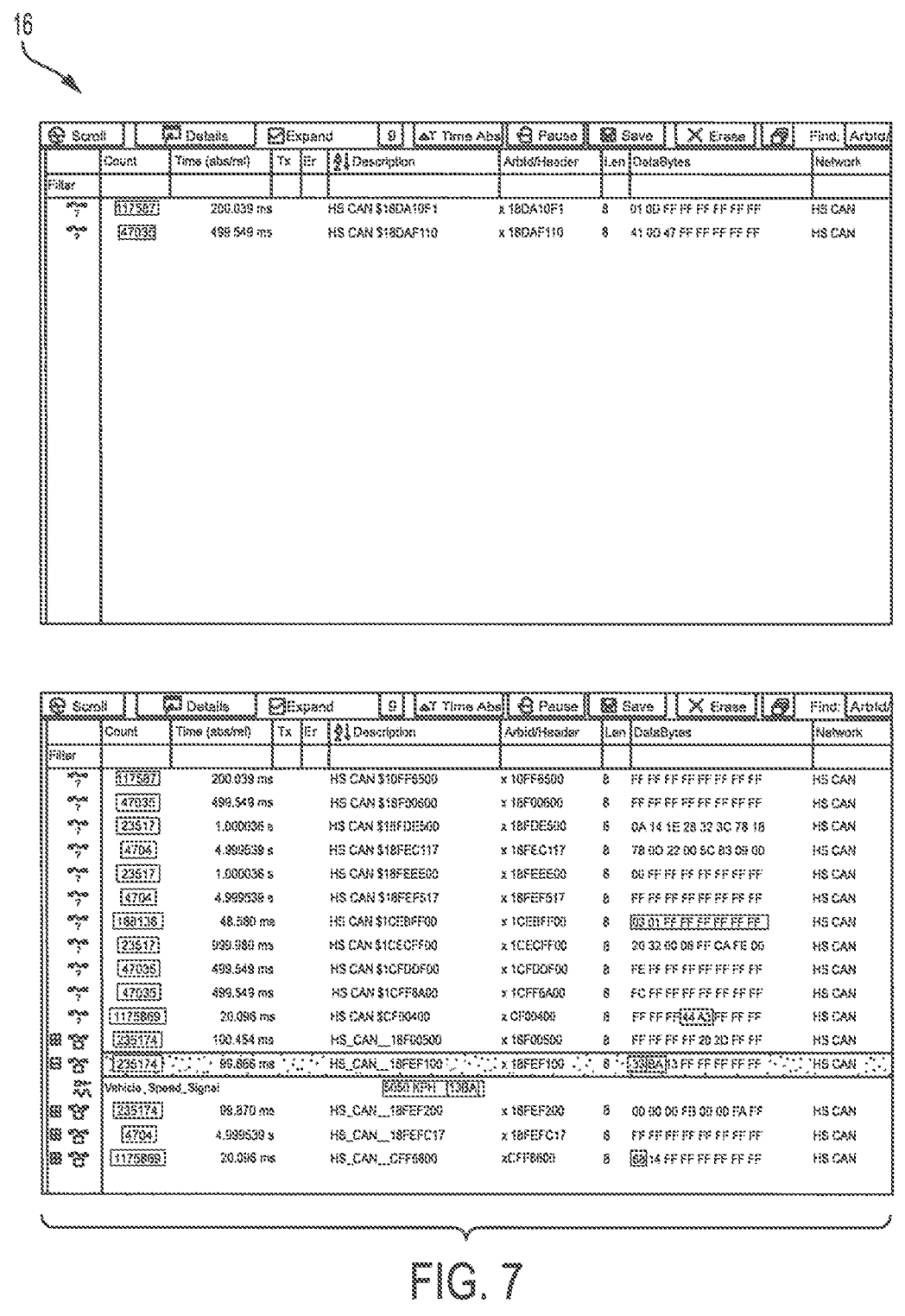

FIG. 7 shows a block diagram of the off road vehicle network translation device methodology according to the present invention.

DESCRIPTION OF THE EMBODIMENT(S)

Figure 1:
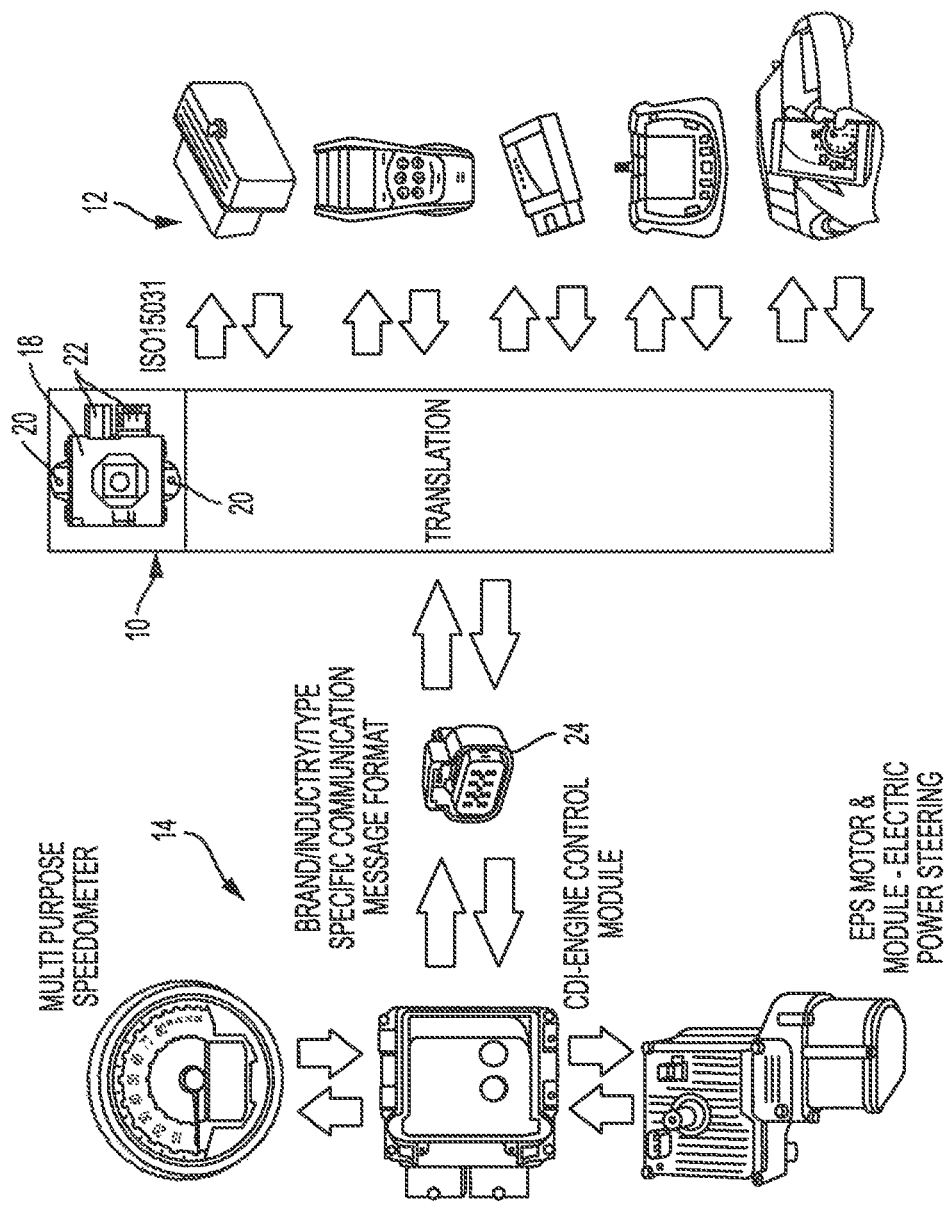
FIG. 1 shows a block diagram illustrating off road network communications and translation of messages to readily available OBD user interface or tools according to the present invention.
Figure 2:
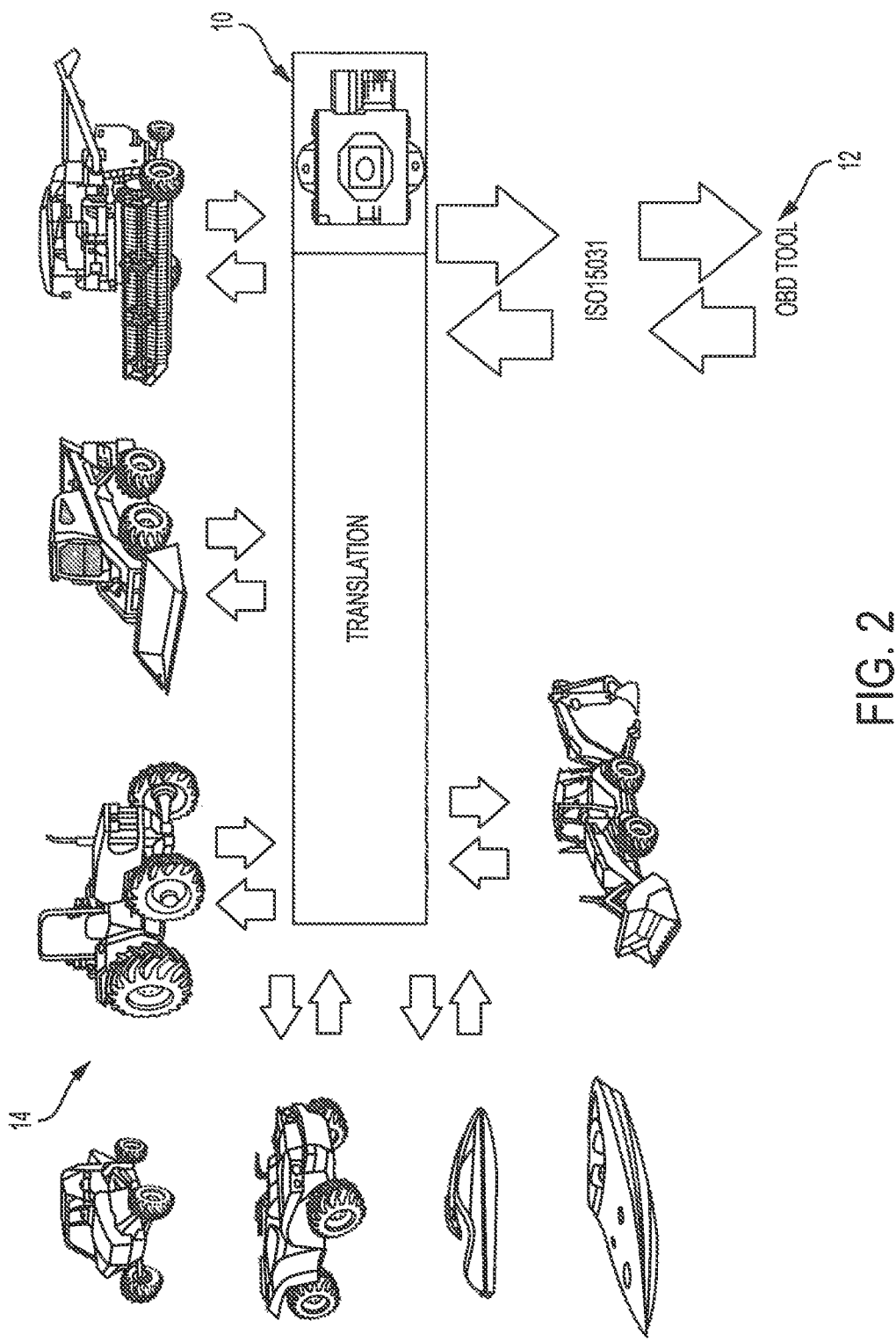
FIG. 2 shows a block diagram illustration of all off road, non ISO 15031 regulated vehicles, being translated for use with ISO 15031 OBD diagnostic tools according to the present invention.
Figure 3:
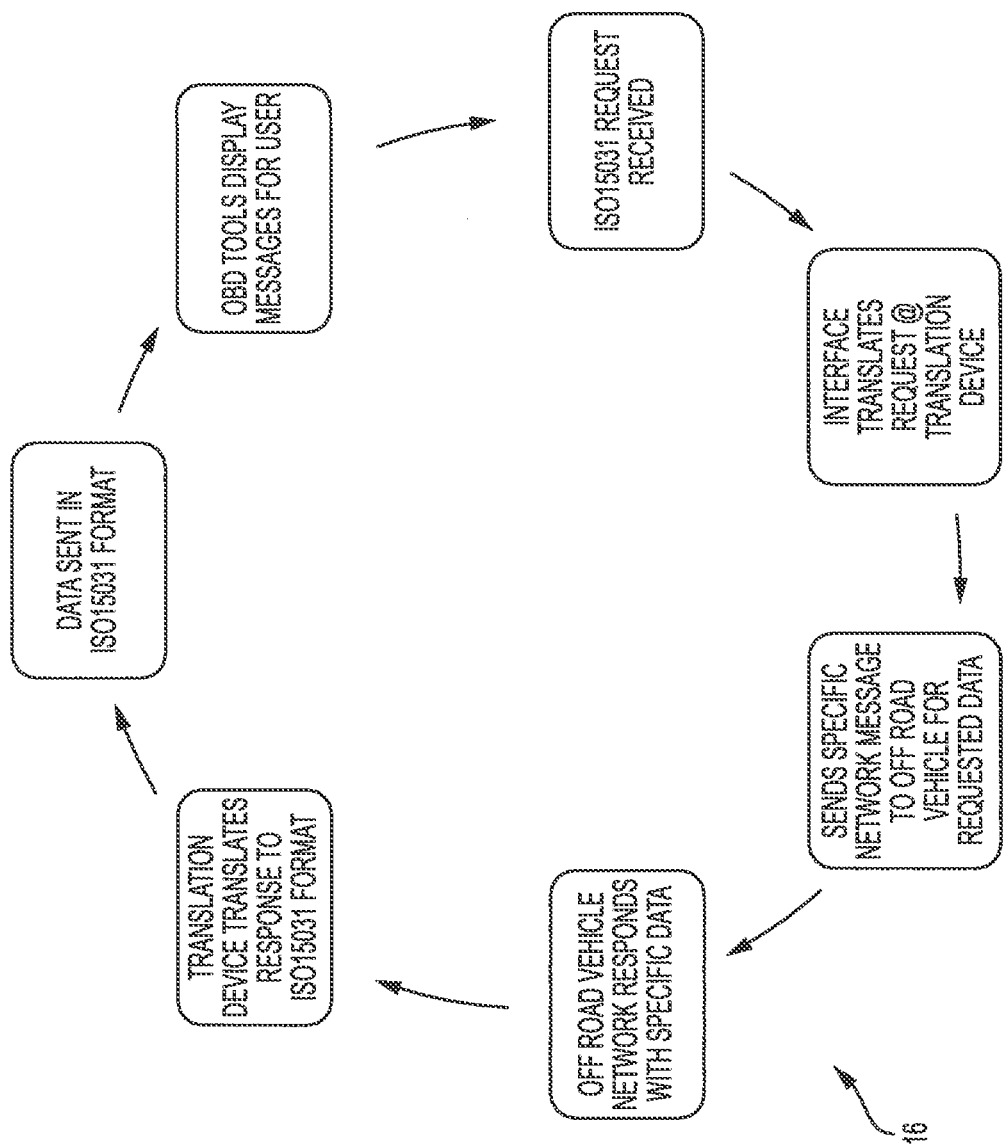
FIG. 3 shows an illustration of the translation process from an off road vehicle network specific format to the ISO 15031 format according to the present invention.
Figure 4:
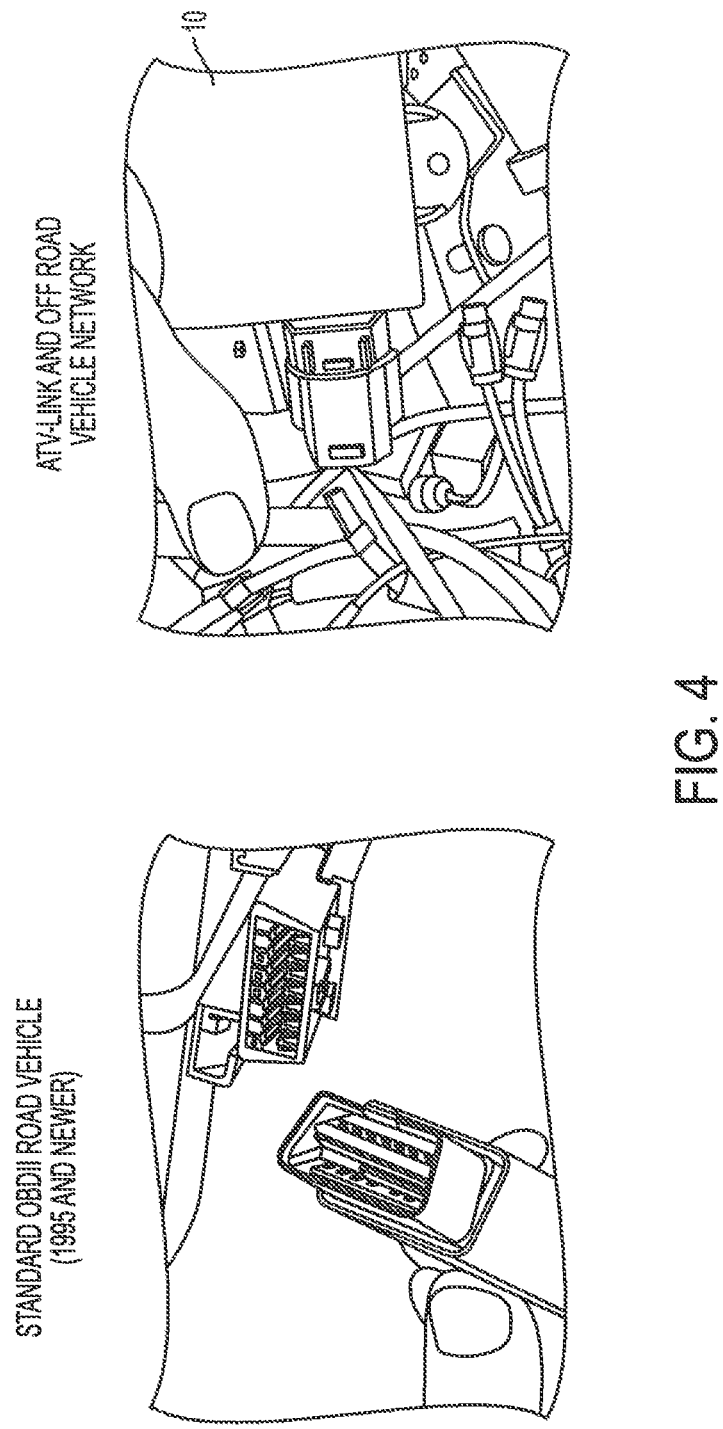
FIG. 4 shows a block diagram of the off road vehicle network translation device methodology according to the present invention.
Figure 6:
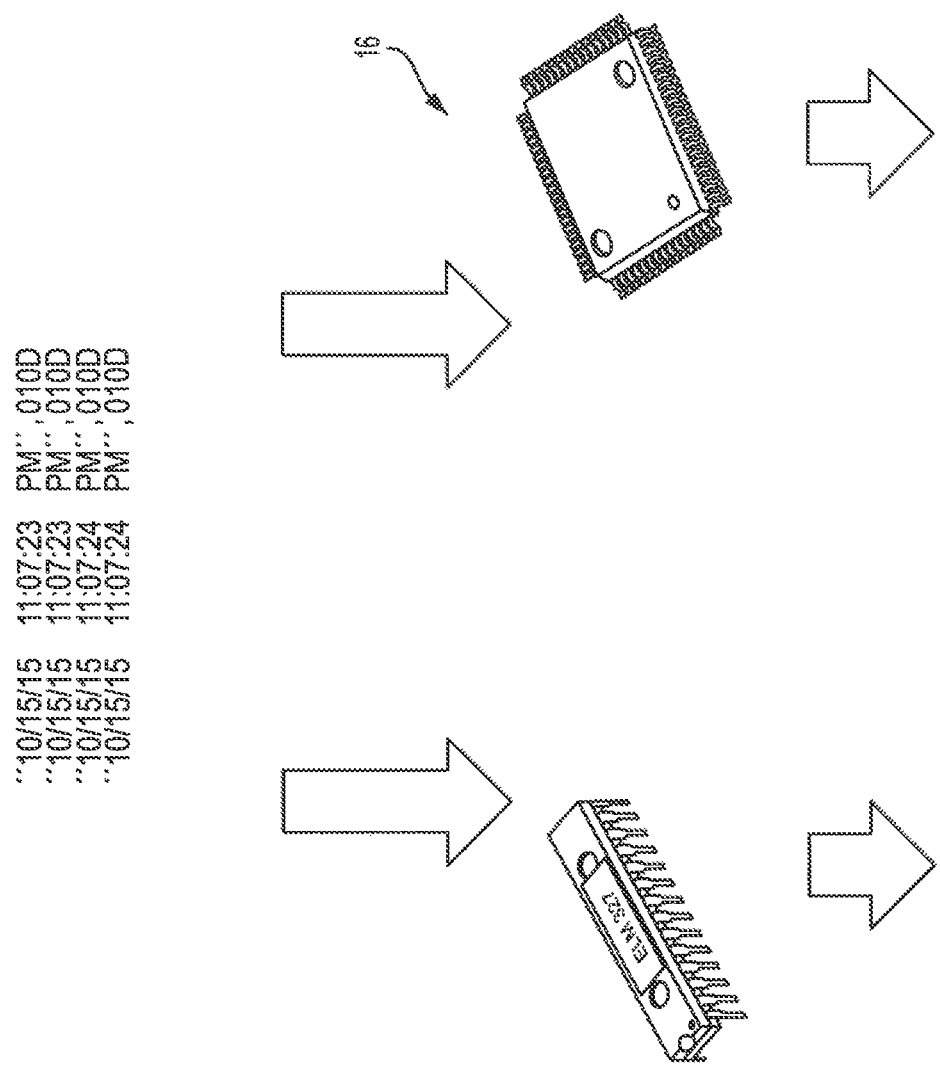
FIG. 6 shows a block diagram of the off road vehicle network translation device methodology according to the present invention.
Figure 8:
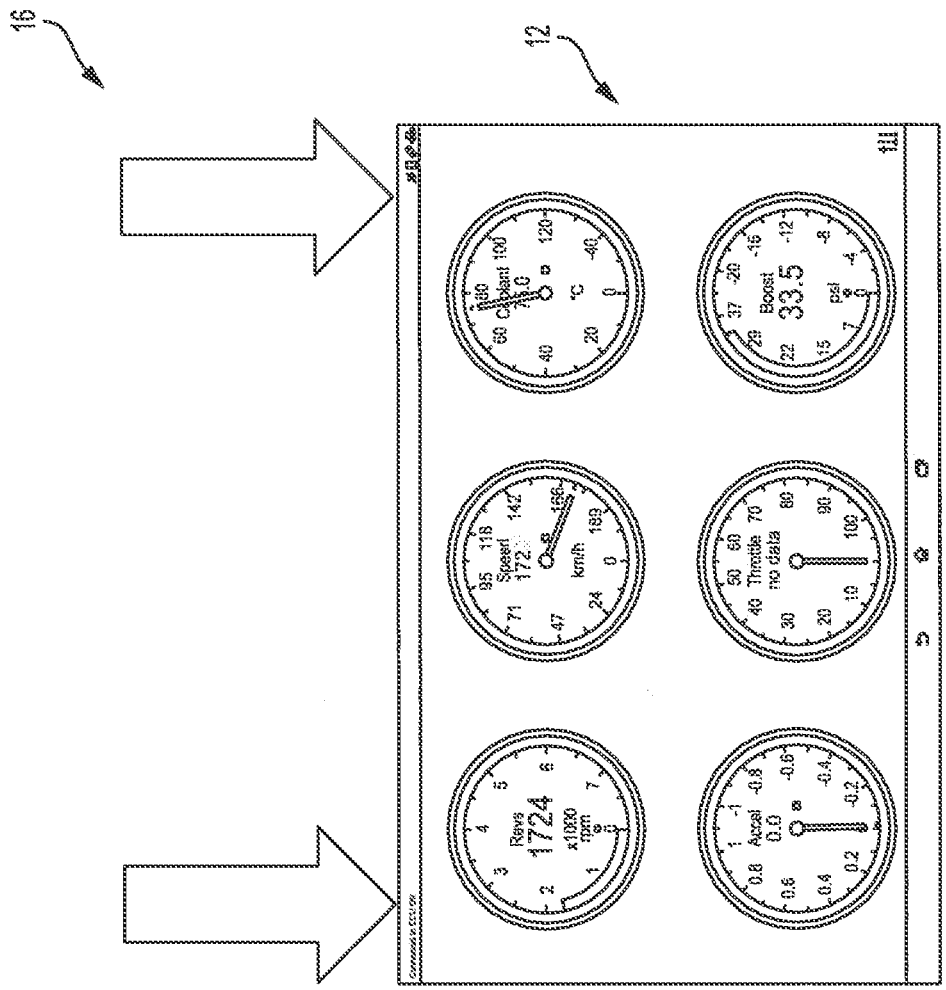
FIG. 8 shows a block diagram of the off road vehicle network translation device methodology according to the present invention.

Referring to the drawings, an off road vehicle network translation device 10 for use with off road vehicle networks is shown. It should be known that off road vehicle networks, defined as communication channels or buses that monitor vehicle parameters and engine status, currently are not required to conform to any standardized diagnostic or SID information exchange. Hence, every off road vehicle manufacturer has its own specific onboard network architecture, hardware, software and formatting making diagnostics and testing manufacturer specific. The off road vehicle network translation device 10 of the present invention may convert all of these different manufacturer specific messages into standardized ISO 15031 messages. This may allow a message from any off road vehicle network to be transmitted to a diagnostic tool 12 in an ISO 15031 standard via Bluetooth, Wi-Fi or any hardwire connection that may then be interpreted by any on road vehicle diagnostic tool 12 in the art. The off road vehicle network translation device 10 may also be capable of monitoring an off road vehicle network 14 and then forwarding this information in an ISO 15031 format to either a diagnostic tool or other user interface 12. The off road vehicle translation device 10 may also be capable of accepting ISO 15031 requests for SID or trouble codes from a diagnostic tool 12 and then translating such requests into the off road vehicle specific message required for the off road vehicle, to which the translation device 10 is connected, such that the unique message may be sent to the off road vehicle manufacturer's network 14 in its own proprietary language. After a module from the off road vehicle network 14 replies with the information to the requested SID or trouble code, the off road vehicle network translation device 10 may then be able to translate and convert that data back into an ISO 15031 standard and be capable of replying to the diagnostic tool 12 with the appropriate message. It should be noted that for some requests a time delay may exceed the ISO 15031 standard, which has a predetermined time delay built in. In such cases, the off road vehicle network translation device 10 may be capable of identifying that this issue is about to occur, and send a keep alive message to the diagnostic tool 12 or user interface ensuring that when a response is received from the off road vehicle manufacturer's network 14 it may be capable of being accepted by the diagnostic tool or user interface 12 to which the off road vehicle network translation device 10 is connected. Having this feature may keep the user interface 12 from timing out as it is designed to work directly on an automobile vehicle network and does not have much of a latency tolerance. This may also allow for the user interface 12 that is being used, to not error out with a time out condition, thus keeping itself alive while the off road vehicle network 14 responds to the off road vehicle network translation device 10.

As shown in the figures, an off road vehicle network translation device 10 is disclosed. The off road vehicle network translation device 10 may allow for the translation of all off road vehicle specific network message formats into ISO 15031 standard messages. This may allow for requests coming from any ISO 15031 compliant device 12 to be translated and forwarded to a specific off road vehicle network 14. The off road vehicle network 14 would then be capable of replying to the requests in its own proprietary messaging format to the off road vehicle network translation device 10. Hence, this may allow for a translation to occur in real time between any standard diagnostic tool 12 and any off road vehicle network 14. The following is a time line of an exchange for an ISO 15031 SID message for vehicle speed to an off road vehicle network through the translation device 10 of the present invention. Please note that this example is only for illustrative purposes and is intended to demonstrate how the translation occurs between the off road vehicle network 14 and the diagnostic tool 12 via the off road vehicle network translation device 10. It should be noted that any other type of translation may occur other than that of vehicle speed as shown in the example. In the process or methodology 16 an ISO 15031 compliant user interface 12 may send a command to the off road vehicle network translation device 10 in the ISO 15031 format of "010D" that is connected via Bluetooth, Wi-Fi or hardwired. It should be noted that any other form of wireless communication or wired communication may be used to interact between the ISO 15031 compliant user interface 12 and the off road vehicle network translation device 10. The off road vehicle network translation device 10 may read this message received from the ISO 15031 user interface 12 and based on the ISO 15031 standard determine that it is a vehicle speed request. The off road vehicle network translation device 10 may then determine, based on its internal software and code, that based on the standard what the response format and multiplier should be. In this example, the off road vehicle network CAN network frame, which is broadcast, and not reserved to be sent only upon a request, sends the broadcast message 18FFFE00F9000FFBD47FF, which in the off road vehicle network CAN format describes the throttle position sensor (TPS) percentage which may be 100/255*C9 which equals 78.8%, a temperature sensor that may have any temperature reported, a barometric air pressure value and a speed value in kilometers per hour or miles per hour. It should be noted any value may be reported for any of these parameters or any other measured variable or parameter. The following may be a standard or ISO 15031 frame sent from the off road vehicle network translation device 10 to an OBD tool 12 that may have sent a request of the same PID, wherein a PID is defined as a parameters ID code request that includes all of the OBDII compliant vehicles and requires them to respond with specific information. Such a message may be 18DAF110 03 41 OD 47, wherein the 47 identifies the speed, in this case 71 KPH at which the vehicle is moving. It should be noted that the above is a broadcast message such that no requests must be made to the off road vehicle network 14. The off road vehicle network translation device 10 may always monitor and read this message and store the value, in this case 71 or 172 KPH in memory. It should be noted that once a request from an ISO 15031 compliant device 12 is received by the off road vehicle network translation device 10, it may read the 71 or 172 KPH value and translate it into an appropriate response. The response may be similar to the message 41 OD 47 and hence may be sent back to the requesting OBD device 12. It should be noted that the user interface may then display the vehicle speed as 71 or 172 KPH as shown in the message that was sent by the off road vehicle network 14. Next, depending on the requested data, the off road vehicle network translation device 10 may either request from the off road vehicle network 14 data or instead read the broadcast data therefrom and once it has the value of the data requested it may convert it back to the ISO 15031 standard and reply to the ISO 15031 complaint device and user interface 10. This may allow for a complete translation of any requested data or any broadcast data between the off road vehicle network 14 and the ISO 15031 compliant device and user interface 12 because of the ongoing translation occurring in the off road vehicle network translation device 10. It should further be noted that there is also an established shorthand communication standard available for aftermarket OBD tools 12 that currently are used most commonly with wireless ISO 15031 interfaces. The off road vehicle network translation device 10 of the present invention may be capable of taking these shorthand messages directly and translating them and respond in correct format to the applications that are designed to communicate with these user interfaces 12. This shows that the off road vehicle network translation device 10 of the present invention not only functions as an off road vehicle network data log tool, but is also capable of simulating an ISO 15031 interface 12 so that the user interfaces 12 do not realize that they are communicating with anything other than a standard device and automobile network.

It should be noted that the off road vehicle network translation device 10 is capable of translating between any standard OBD tool or mobile device application 12 and any known brand, industry, or specific communication measure format of an off road vehicle network 14 that may use or have any known off road vehicle diagnostic plug therein. The off road vehicle network 14 may be capable of monitoring multiple purpose speedometers, CDI engine control modules or EPS motor and module for the electric power steering and any other controlled system of the off road vehicle. It should be noted that the off road vehicle network translation device 10 may translate all off road vehicle proprietary messaging into the ISO 15031 standard, thus allowing any known OBD tool 12 to be used with any off road vehicle, wherein the OBD tool 12 may not realize that it is in communication with an off road vehicle, but may think it is communicating with an on the road vehicle. It should be noted that the off road vehicle network translation device 10 generally has a rectangular or square shaped body 18 that may have a first and second flange 20 extending therefrom, wherein the flanges 20 are used to connect the off road vehicle network translation device 10 to an off road vehicle, or any other device or surface. It should be noted that any other shape may be used for the body 18. The off road vehicle network translation device 10 may also include a first and second port 22 extending from a surface thereof wherein one of the ports 22 may be used to connect to the OBD tool 12 to establish electrical communication therewith while the other may be used to connect to an off road vehicle diagnostic plug on the opposite end thereof. It should be noted that the off road vehicle network translation device 10 may connect directly to such OBD tools 12 or off road vehicle diagnostic plug or may be connected via a wireless connection thereto. It is also contemplated to have a universal plug or socket connected thereto. It should be noted that the off road vehicle network translation device 10 generally has a plastic body, however any other known material, such as any known metal, ceramic, plastic, composite or natural material may also be used for the off road vehicle network translation device 10. It should be noted that the off road vehicle network translation device 10 also may include a plurality of IC chips and other electrical circuits arranged on a circuit board or other electronic device within the body 18 of the off road vehicle network translation device 10. It should further be noted that the appropriate software necessary to translate any off road vehicle network message into a standard ISO 15031 is also hardwired, stored, or sent via wireless communication to the off road vehicle network translation device 10. It is also contemplated that the off road vehicle network translation device 10 may have the appropriate electronics to electronically send and receive signals, either wirelessly or wired, between an OBD diagnostic tool 12 and an off road vehicle network 14.

As shown in the figures, the off road vehicle network translation device 10 may create an interface between an OBD diagnostic tool 12 and an off road vehicle network 14 and then translate information between the two devices. The translation may occur as follows in one contemplated embodiment:

A wireless or wired connection is established between a mobile device or computer 12 and the off road vehicle network translation device 10. Next set up and configuration commands may be sent via a wireless or wired link to configure and identify the interface between the off road vehicle network translation device 10 and the OBD compliant interface 12. These commands may be sent using a standard AT command set developed by ELM Electronics or any other known command set may also be used. It should be known that any other setup or configuration commands may also be sent or used. It should further be noted any other known or future protocol between software/mobile applications and a device may be used with the present invention, such as but not limited to, ELM, GoPoint, etc., to OBDII, etc. Next the OBD tool software may send a request for a PID (for example speed or any other known component). This request is generally sent from the software in the form of a "010D" message. The interface of the off road vehicle network translation device 10 may recognize this command and send the appropriate network message to the off road vehicle network 14 in the manufacturers own language, requesting this information. The speed request from the OBD diagnostic tool 12 may be defined in the ISO 15031 standard and as such, the speed message may be "7DF 02 01 0D" wherein the message may be padded with zeros after the frame depending on the message length requirement. After this message is received by the off road vehicle network translation device 10 there is no need to send a request to the off road vehicle network 14 because in this example a particular PID broadcast is continuous from the control module of the off road vehicle network 14. Hence, the off road vehicle network translation device 10 is able to determine what the request is and then extract the information from the broadcast message sent from the off road vehicle network 14. In one example, the broadcast message is "18F FF FE 00 F9 00 00 00 FF BD 47 FF". The off road vehicle network translation device 10 may be capable via its software of determining that the speed value is being reported on the second least significant byte "47" and also determines what multiplier and calculation needs to be performed to this message to retrieve the actual value in MPH or KPH. In another example, the off road vehicle network translation device 10 may receive a response from the network control module after sending the request and may forward the translated response after trimming any trailing zeros back to the OBD diagnostic tool application 12. For example, the response may look something like this from the off road vehicle network translation device 10 "7EA 03 41 0D 7F 00 00 00 00" wherein what actually is sent back to the OBD user interface 12 is "41 0D 7F". Hence, the off road vehicle network translation device 10 may provide a standard calculation defined by the ISO 15031 and then send such value to the OBD diagnostic tool 12, which does its standard calculation and displays the speed to the user on its interface 12. It should be noted that the off road vehicle network translation device 10 of the present invention may take the message it captures from the off road vehicle network 14 broadcast, in this case because no request is needed, and then extract the speed and then encode it into the ISO 15031 standard, thus translating the message from the off road vehicle network 14 into the ISO 15031 standard. The off road vehicle network translation device 10 may then respond to the OBD user interface 12 with the same format message such as "41 0D ##", wherein the ## indicates the calculated HEX equivalent of the speed as determined by the off road vehicle network translation device 10 operating software. This exchange between the off road vehicle network translation device 10 and the OBD diagnostic tool 12 and between the off road vehicle network translation device 10 and the off road vehicle network 14 happens many times per minute giving the user real time fast and accurate data, as well as enabling any ISO 15031 or ELM AT command compliant application to request and obtain data seamlessly and unknowingly from a non ISO 15031 compliant network. Hence, the off road vehicle network translation device 10 is capable of being used with any specific off road vehicle network manufacturer and may allow any OBD diagnostic tool or user interface 12 to read and communicate with the off road vehicle network 14 in a seamless error free manner.

As shown in the drawings, the off road vehicle network translation device 10 may receive an ISO 15031 request. The off road vehicle network translation device 10 may then translate the request message and send a specific network message to the off road vehicle network 14 for the requested data. The off road vehicle network 14 may then respond with the requested specific data, in its own messaging format, to the off road vehicle network translation device 10, which may then translate the response from the off road vehicle network 14 into the ISO 15031 standard format. Next the off road vehicle network translation device 10 may send the data in ISO 15031 format to the OBD diagnostic tool 12, which may display the message to user of the OBD diagnostic tool 12. This interaction between the OBD diagnostic tool 12, the off road vehicle network translation device 10 and the off road vehicle network 14 occurs many times per minute and allows for the seamless transmission of messages and data between the devices.

It should be noted that the off road vehicle network translation device 10 is capable of taking any ISO 15031 standard command requests from any type of OBD tool, phone application, computer OBD software tools 12 as well as aftermarket ELM 327 command tools and translate all of these into the required language to obtain requested data from any known off road vehicle network 14. The off road vehicle network translation device 10 is capable of handling all of the collection of data from the off road vehicle network 14, and then replying to the user interface of the OBD tools 12 in an ISO 15031 formatted response. This may allow the OBD diagnostic tool device 12 making the request to be unaware that it is communicating with a non OBDII compliant vehicle, thus allowing the user interface of the OBDII diagnostic tool 12 to operate as though it were connected to an on the road automobile network, even though it is actually connected to an off road vehicle network 14. The off road vehicle network translation device 10 is also capable of using its own algorithm to translate between the off road vehicle networks proprietary and specific language and the standard ISO 15031 standard. The OBD diagnostic user interface 12 is able to view the messages in a commonly used interface or a custom user interface that allows read and write capabilities to the off road vehicle network 14. It should be noted that the off road vehicle network translation device 10 may allow communication to any known off road vehicle network 14 wherein the off road vehicle network translation device 10 may be capable of translating the information from the off road vehicle network 14 and sending or transmitting it to a phone application or other user interface using a standard OBD format. It should be noted that the off road vehicle network translation device 10 may be programmed to be specifically compatible with one vehicle manufacturer network but compliant to a universal output that may be read and controlled by various software packages and devices. It should further be noted that it may be programmed to be compatible with any off road vehicle manufacturer network and compliant to any universal output that may be read and controlled by various software packages and devices.

In operation, the off road vehicle network translation device 10 is capable of being used on or with any off road vehicle network 14. First, the off road vehicle network translation device 10 user may locate the off road vehicle data port and connect the off road vehicle network translation device 10 directly to the port or use a conversion harness to allow a standard off road vehicle network translation device connector to match the harness, thus allowing for an electrical communication to occur between the off road vehicle network translation device 10 and the off road vehicle network 14. Next, the user of the off road vehicle network translation device 10 may open a software application and establish communication with a wireless or wired OBD interface tool 12. It should be noted that the interface and electronic communication may be via a wired connection between the OBD tool 12 and the off road vehicle network translation device 10. It should further be noted that the electronic communication between the off road vehicle network translation device 10 and the off road vehicle network 14 may also occur via a wireless or wired interface. Next, initial configuration of the communication between the off road vehicle network translation device 10 and the wireless OBD interface 12 component is made wherein an identification of the wireless interface configuration in order to start communication with the off road vehicle network is set. It should be noted that generally this is done via Wi-Fi or Bluetooth, but as discussed above, may be done via a hard wired connection. Next, the application may send any known command to the wireless OBD interface. The OBD tool 12 may send a predetermined command to the off road vehicle network translation device 10 such as a request for current vehicle speed, which may be in the form of (010D). It should be noted that any other requests may be made such as torque, temperature or any other known requests or parameters from an off road vehicle network. Next, a micro controller unit (MCU) arranged on the inside circuitry of the off road vehicle network translation device 10 may receive this command from the OBD tool 12 and determine what messages are required to be sent to the off road vehicle network 14 control module based on the year, make, and model of the off road vehicle network 14. It may then send this information after it determines the specific off road vehicle control module requesting the speed or other parameter from the off road vehicle network 14. It should be noted that the MCU determines the year, make and model of the off road vehicle network 14 from the VIN requests that it sends to the off road vehicle at power up of the off road vehicle network translation device 10. After it sends the request, in this example the vehicle speed, it then may wait and listen for a response from the off road vehicle network 14. Next, the electronic control unit of the off road vehicle network 14 may broadcast the speed to the instrument cluster over the CAN network. The off road vehicle network translation device 10 may sense this and listen for the message that contains that speed value. The off road vehicle network translation device 10 may then process the message using the off road vehicle specific equation to get the raw speed value, i.e., 74 KPH. Next the off road vehicle network translation device 10 may encode the value back into a standard ISO 15031 CAN message in the required format that the OBD tool and application 12 running it will expect. It should be noted that in one embodiment the off road vehicle network translation device 10 does not send any message for the PID since it is continuously sent by the control module to the cluster of the off road vehicle. The off road vehicle network translation device 10 continuously monitors the off road vehicle network 14 for a specific message header such as (18FEF100) 33 BA 13 FF FF FF FF FF. The off road vehicle network translation device 10 may realize that because of the embedded code that the first two bytes of the message are speed. The off road vehicle network translation device 10 may then decode the raw value using the off road vehicle manufacturer specific formula. It then re-encodes it using the standard OBD ISO 15031 formula and may reply to the application running the OBD tool or interface 12 with the standard response with the speed encoded therein. As the off road vehicle network translation device 10 determines that the speed is 74 KPH from its embedded program it will then take this value and convert it to a standard OBD message and value of (41 0D 47) which is the ISO 15031 standard. The message being sent from the off road vehicle network translation device 10 to the OBD tool 12 may then be displayed as speed on the user interface of the OBD tools user interface 12. It should be noted that any type of parameter, such as but not limited to PSI throttle data, acceleration, RPM's, speed, coolant temperature, engine temperature, may be requested from the off road vehicle network 14 and sent to an OBD compliant device 12 via the off road vehicle network translation device 10. It should be noted that the above examples just show a request for speed, but any request for any other parameter available on the off road vehicle network 14 may be made. The off road vehicle network translation device 10 may be capable of taking any requested message from an OBD user interface 12 and get that information from the off road vehicle networks proprietary system and translate it into an ISO 15031 standard, which is capable of being read by all OBD interfaces, thus allowing for any OBD standard interface 12 to be used to control and monitor an off road vehicle and its associated parameters, even though the off road vehicle network 14 operates under a proprietary messaging system. Thus, the use of the off road vehicle network translation device 10 may make it easy for a mechanic or owner to work on any known off road vehicle as the specific off road vehicle network 14 may be capable of being translated into an OBD standard format via any known OBD diagnostic tool or user interface application 12.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. An off road vehicle network translation system, said system comprising:
    a translation device, said translation device converts all of off road vehicle manufacturer specific messages into ISO 15031 messages;
    one of a plurality of predetermined off road vehicle diagnostic plugs in communication with said translation device, said one of a plurality of off road vehicle diagnostic plugs is connected to a predetermined off road vehicle engine control module; and
    one of a plurality of standard on board diagnostic tools in communication with said translation device, said translation device sends and receives information with said on board diagnostic tool in a predetermined formatted response, said translation device sends and receives information with said off road vehicle engine control module in a specific off road vehicle network language associated with said off road vehicle engine control module.

2. The system of claim 1 wherein said predetermined formatted response is a standard ISO 15031 communication.

3. The system of claim 1 wherein said translation device monitors said one off road vehicle network and forwards information therefrom in a standard ISO 15031 format.

4. The system of claim 1 wherein said translation device accepts service ID or trouble codes in a specific off road vehicle network language and translates said codes into an ISO 15031 format, said translated codes are transmitted to said on board diagnostic tool for display.

5. The system of claim 1 wherein said translation device identifies a time delay and sends a predetermined message to said on board diagnostic tool to stay active.

6. The system of claim 5 wherein said translation device forwards a response to said off road vehicle engine control module to said on board diagnostic tool in real time, said predetermined message sent keeps said on board diagnostic tool active.

7. The system of claim 1 wherein said translation device transmits a specific off road vehicle network message to said on board diagnostic tool via a wireless or hardwired system.

8. The system of claim 1 wherein said translation device receives information from sub-modules of said off road vehicle engine control module.

9. The system of claim 1 wherein said translation device having a generally rectangular or square shaped body.

10. The system of claim 9 wherein said translation device having a first and second flange extending from said body.

11. The system of claim 10 wherein said translation device having a first and second port extending from said body.

12. A method of communicating between a specific off road vehicle network and a standard on board diagnostic tool, said method comprising the steps of:
    connecting a translation device between the specific off road vehicle network and the standard on board diagnostic tool;
    receiving by said translation device a first ISO 15031 formatted message from the standard on board diagnostic tool;
    translating by said translation device said ISO 15031 message into a specific off road vehicle network message;
    sending said specific off road vehicle network message to the specific off road vehicle network;
    receiving by said translation device specific data from the specific off road vehicle network;
    receiving by said translation device specific data from the specific off road vehicle network;
    translating by said translation device said specific data into a second ISO 15031 formatted message; and
    sending via said translation device said second ISO 15031 formatted message to the standard on board diagnostic tool.

13. The method of claim 12 further comprising the step of displaying said second ISO 15031 formatted message on the standard on board diagnostic tool.

14. The method of claim 12 wherein said step of sending said specific off road vehicle network message includes a request for data from the specific off road vehicle network.

15. The method of claim 12 wherein said step of connecting is by a wireless or wired system.

16. The method of claim 12 wherein said translation device is compatible with a plurality of specific off road vehicle networks and a plurality of standard on board diagnostic tool.

17. The method of claim 12 further comprising the step of converting all manufacturer specific messages into an ISO 15031 standard.

18. The method of claim 12 further comprising the step of monitoring the entire specific off road vehicle network and transmitting monitored information in an ISO 15031 standard format from said translation device.

19. A method of communicating between a specific off road vehicle network and a standard on board diagnostic tool, said method comprising the steps of:
    connecting a translation device between the specific off road vehicle network and the standard on board diagnostic tool;
    receiving by said translation device a first ISO 15031 formatted message from the standard on board diagnostic tool;

translating by said translation device said ISO 15031 message into a specific off road vehicle network message;

sending said specific off road vehicle network message to the specific off road vehicle network;

receiving by said translation device specific data from the specific off road vehicle network;

receiving by said translation device specific data from the specific off road vehicle network;

translating by said translation device said specific data into a second ISO 15031 formatted message;

sending via said translation device said second ISO 15031 formatted message to the standard on board diagnostic tool; and identifying a time delay and sending a keep alive message to the standard on board diagnostic tool from said translation device.

* * * * *